United States Patent Office 3,592,933
Patented July 13, 1971

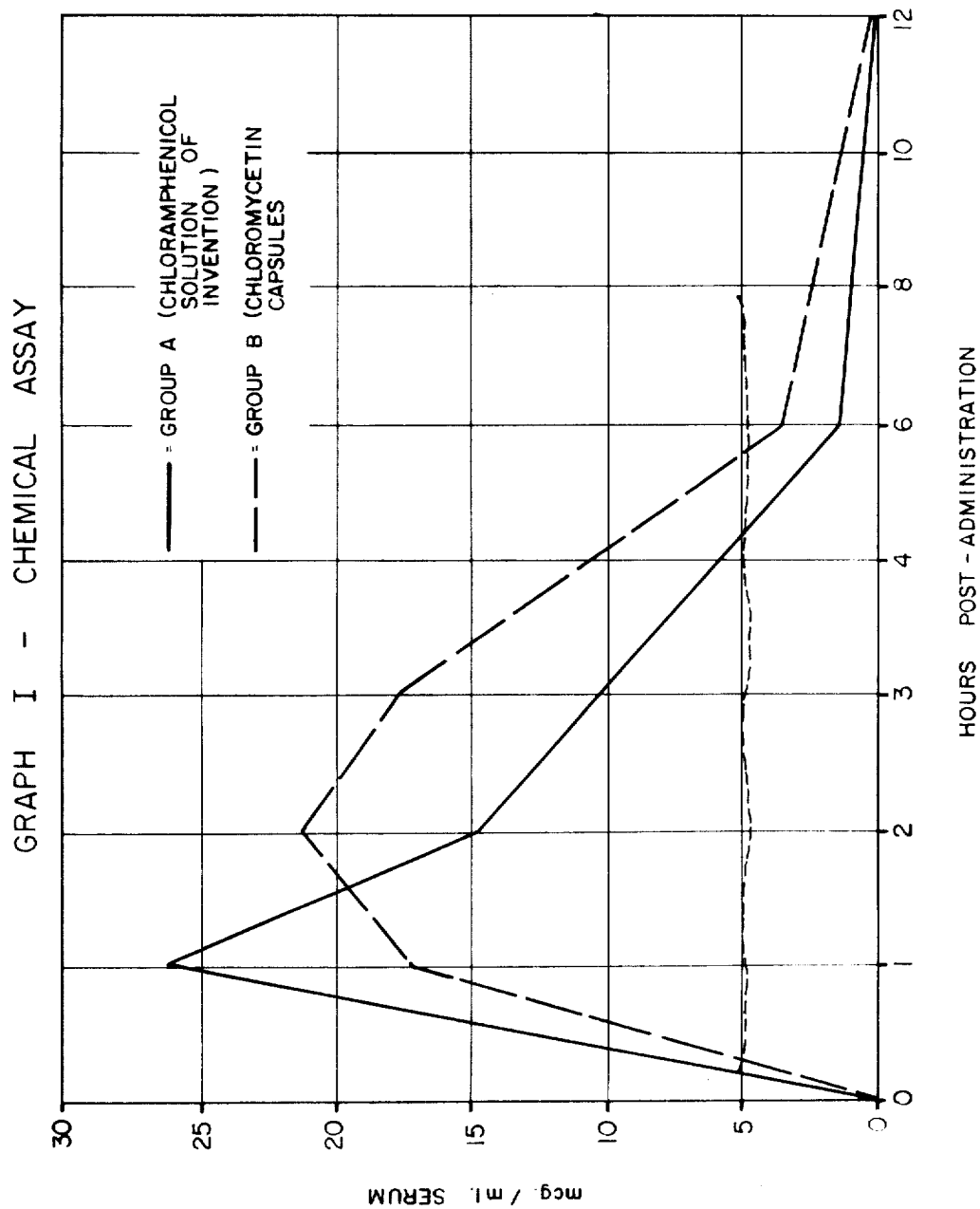

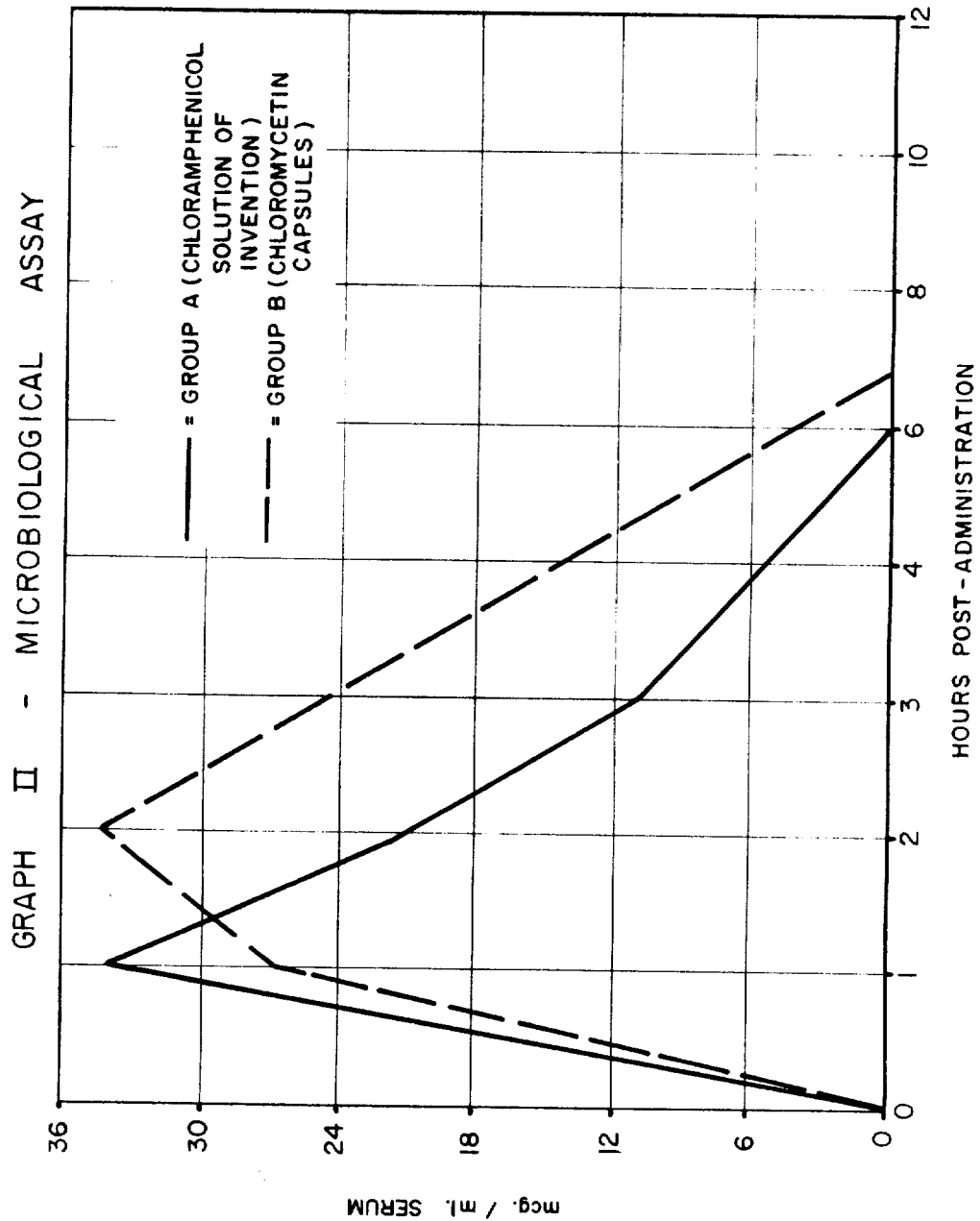

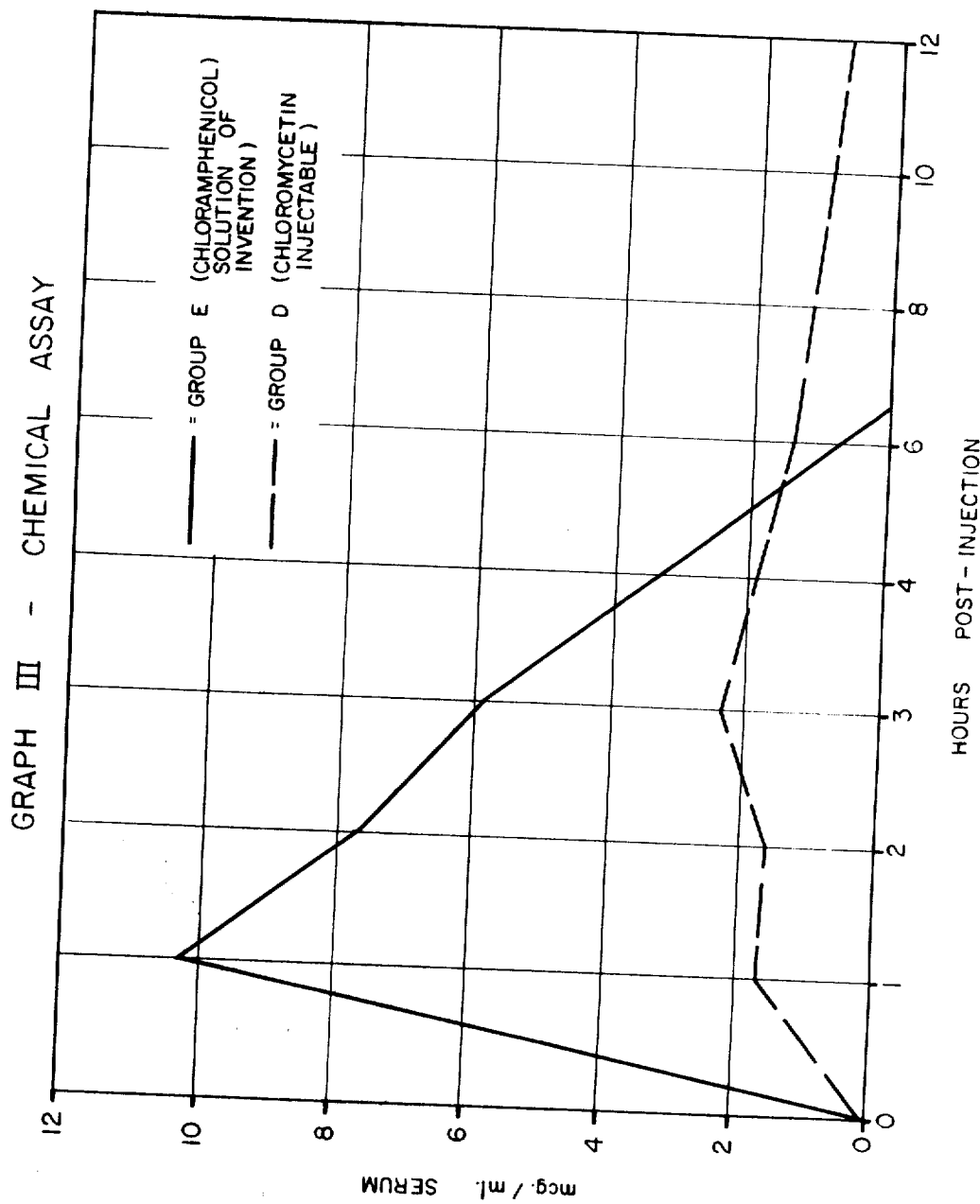

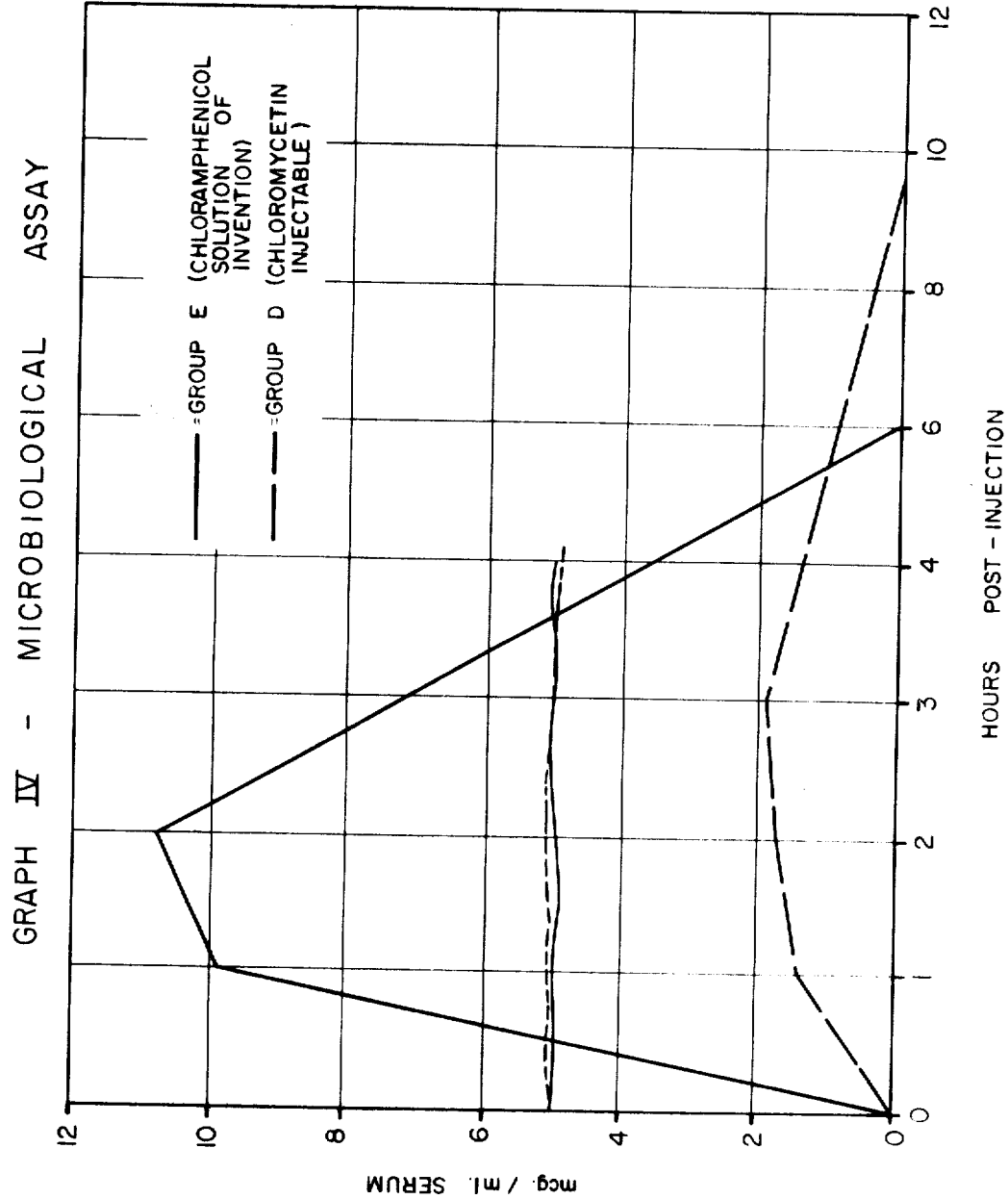

3,592,933
TREATMENT OF INFECTIONS IN ANIMALS WITH CHLORAMPHENICOL SOLUTION
Frederick W. Kullenberg, 7620 Belmont Drive, Ralston, Nebr. 68127
Filed June 18, 1969, Ser. No. 834,276
Int. Cl. A61k *21/00*
U.S. Cl. 424—324
5 Claims

ABSTRACT OF THE DISCLOSURE

In the treatment of infections in the mammalian and avian orders of animals by administration of effective dosages of chloramphenicol to said infected animals, the improvement which comprises administering said chloramphenicol as a composition wherein each cubic centimeter consists essentially of:

Chloramphenicol—About 20 to 200 mg.
Niacinamide—About 5 to 10%
Ethyl alcohol—About 1 to 10%
Propylene glycol—Balance

---

This invention relates to an improved method for the treatment of systemic infections in animals of the mammalian and avian orders. More particularly, the invention is directed to an improvement in the treatment of such animals using a special formulation of the antibiotic chloramphenicol.

Chloramphenicol is a well known broad spectrum antibiotic whose chemical name is D(—)threo-1-p-nitrophenyl-2-dichloroacetamido-1,3-propanediol. The activity of chloramphenicol was first demonstrated in culture filtrates from a species of soil organism collected in Venezuela, later designated as *Streptomyces venezuela*. The antibiotic was subsequently isolated from culture filtrates, identified chemically and later synthesized.

Discretionary use of chloramphenicol has provided very promising results. It has proved, for example, to be strongly active bacteriostatically against gram negative bacteria as well as against both acid fast and non-acid fast types of gram positive bacteria. Many of the larger viruses are also found susceptible to the action of chloramphenicol. The following organisms have been found to be killed or inhibited by effective dosages of chloramphenicol: *Bacillus mycoides, Borrelia recurrentis, Brucella abortus, Brucella suis, Brucella melitensis, Salmonella schottmulleri, Escherichia coli, Klebsiella pneumonial, Pasteurella tularansis, Proteus vulgaris, Aerobacter aerogenes, Pseudomonas aeruginosa, Shigella paradysentaria, Staphylococcus pyogenes* var. *aureau* and *Streptococcus pyogenes*. Clinical veterinary use has found chloramphenicol very effective for bacterial pulmonary infections, urinary tract infections, gastroenteritis with accompanying diarrhea, bacterial infections associated with canine distemper, bacteria cystitis and nephritis, infectious panleukopenia, hard pad disease, coccidiosis, acute otitis media and the like. Virus infection experiments in animals indicate some degree of activity against psittacosis, pneumoencephalitis (Newcastle disease) and lymphogranuloma venereum.

Microbiological and colorimetrical assay methods in experimental animals have shown that chloramphenicol is rapidly and almost completely absorbed from the gastrointestinal tract. Also, blood serum levels or concentrations of the active form of the drug reach a peak in about two hours after a single oral dosage. Smaller amounts are present at about eight hours and at the end of twenty-four hours the drug cannot be detected in the blood. Maximum serum concentrations obtained tend to be proportional to the dose administered.

It has now been surprisingly found that in the treatment of infections in the mammalian and avian orders of animals by the administration of effective dosages of chloramphenicol to said infected animals, higher blood levels are obtained and at a faster rate if the chloramphenicol is administered as a composition, each cubic centimeter of which consists essentially of:

Chloramphenicol—About 20 to 200 mg.
Niacinamide—About 5 to 10% (w./v.)
Ethyl alcohol—About 1 to 10% (v./v.)
Propylene glycol—Q.S. (quantity sufficient) or balance The reasons why the formulation enables the attainment of higher blood levels at faster rates are not known for certain and, therefore, I prefer not to be bound to any theory or explanation. It appears, however, that the result is achieved by a working independence between the ingredients of the formulation in the defined proportions with the niacinamide playing a major role.

The working examples below will demonstrate that the compositions of the invention do, in fact, provide these advantages. In addition, use of the formuation provides an additional advantage over commercial compositions of chloramphenicol in that it need not be reconstituted at the time of use. Moreover, the composition of the invention compares quite favorably with the commercial chloramphenicol compositions from the standpoint of overall systemic safety.

If desired, small amounts of other ingredients commonly added to chloramphenicol type antibiotic dosage formulations may be incorporated in the composition of the invention as, for instance, preservatives, stabilizers, other buffering agents and solvents, etc., as long as they do not unduly deleteriously affect the characteristics of the composition that provide the novel advantages. A preferred ingredient is benzyl alcohol which is a preservative and when employed is present in each cubic centimeter of the composition at a concentration of about 0.5 to 10% (v./v.).

The following formulation is an especially preferred composition for use in the invention:

Each cubic centimeter contains:

Chloramphenicol—100 mg.
Niacinamide—5% (w.v.)
Ethyl alcohol—10% (v./v.)
Benzyl alcohol—2% (v./v.)
Propylene glycol—Q.S. or balance The compositions of the invention are solutions and may be prepared by simply blending the ingredients together. The chloramphenicol and other ingredients are solubilized in the ethyl alcohol-propylene glycol solvent system at room temperature but, if desired, gentle heating and stirring may be used to effect more rapid solution. Also, the niacinamide and benzyl alcohol may be added to the mixed alcohol solution either before or after solubilization of the chloramphenicol. Preferably, however, the niaminamide is added after solubilization of the chloramphenicol and in an amount sufficient to bring the pH of the final solution to about 6.3 to 6.8.

The chloramphenicol solutions of the invention may be administered to the infected animals either orally or parenterally, that is, intramuscularly, intraveneously or subcutaneously. The actual dosage employed will vary depending primarily upon the disease and the animal treated, the size of the animal, and the form of administration. Ordinarily, the dosage ranges from 3 to 50 mg./lb. of body weight from one to four times a day. With the treatment of dogs usually about 15 to 25 mg./lb. body weight is administered orally every six hours, while when the solution is used parenterally about 5 to 15 mg./lb. body weight is generally administered twice daily. These dosages can be increased or decreased depending upon the particular circumstances. Of course, in the treatment of smaller animals, smaller amounts are usually called for and conversely, larger dosages may be used with animals larger than dogs. It should, perhaps, be mentioned that in the oral administration of the chloramphenicol, it is recommended that administration be effected by stomach tube in view of the intensely bitter taste of chloramphenicol.

The animals which may be treated in accordance with the present invention are those belonging to the mammalian and avian orders. Illustrative of such animals are dogs, cats, horses, cattle, sheep, swine and the like; poultry such as chickens, turkeys, ducks, geese and the like; and small laboratory animals such as hamsters, gerbils, rats, mice, guinea pigs, etc.

The following examples are included to further illustrate the present invention but are not to be construed as limiting the invention.

EXAMPLE I

The following ingredients were blended together in the defined proportions to form a solution:
Each cc. contains:

Chloramphenicol—100 mg.
Niaminamide—5% (w./v.)
Ethyl alcohol—10% (v./v.)
Benzyl alcohol—2% (v./v.)
Propylene glycol—Q.S. or balance This formulation was employed in the treatments described in the following examples.

EXAMPLE II

A two year old German Shepherd weighing 85 lbs. was diagnosed as having a bite abscess. The dog exhibited a temperature preliminary to treatment of 105° F. The dog was orally administered 1500 mg. of the composition of Example I three times a day for three days.

Results: The fever was reduced from 105° F. to 102.8° F. in eighteen hours. The subsequent morning the dog's temperature was 101° F. No side effects were experienced.

EXAMPLE III

A one and one-half year old German Shepherd weighing 74 lbs. was diagnosed as having tonsillitis, laryngitis, tracheitis, with accompanying gastroenteritis. The symptoms exhibited by the dog were vomiting, diarrhea, anorexia and severe weight loss. The dog was orally administered 1800 mg. of the composition of Example I three times a day for five days.

Results: The dog showed a rapid reversal of symptoms with no side effects.

EXAMPLE IV

A 75 lb. German Shephered was diagnosed as having pneumonia of the left lung and congestion of the right lung accompanied by rhinitis, laryngitis, tonsillitis and tracheitis. The symptoms exhibited by the dog were dyspnia, a discharge from the eyes and nose, anorexia and a temperature of 104° F. The dog was orally administered 1200 mg. of the composition of Example I three times a day for five days.

Results: The fever was reduced to 102.8° F. on the morning following the start of treatment. Pneumonia and congestion were not detectable on the third day of treatment. No side effects were noted.

EXAMPLE V

A three month old wire-haired terrier weighing 5 lbs. was diagnosed as having pneumonia. The symptoms exhibited by the dog were moist respiratory rales, coughing, slight anemia and a temperature of 103.8° F. The dog was administered 60 mg. of the composition of Example I by intramuscular injection four times a day for three days.

Results: In twenty-four hours, the temperature had returned to normal, and the dog's appetite was good.

EXAMPLE VI

A three year old Springer Spaniel weighing 40 lbs. was diagnosed as having tracheobronchitis. The dog exhibited coughing, gagging, slight appetite loss, conjunctivitis and a temperature of 102.8° F. The dog was administered 400 mg. of the composition of Example I by intramuscular injection three times a day for three days.

Results: There was rapid response to the treatment with cessation of cough. There was complete recovery in 72 hours with no side effects.

EXAMPLE VII

A five and one-half year old Poodle weighing 13 lbs. was diagnosed as having acute tonsillitis. The dog exhibited the following symptoms: vomiting, anorexia, dehydration, a temperature of 104.8° F., a white blood cell count of 19,200 with shift to left; urinalysis was negative for kidney infection. The dog was administered 150 mg. of the compound of Example I by subcutaneous injection twice a day for four days.

Results: Acute infection was controlled so that the animal was normal by owner's standards in four days. The only side effect noticed was some thickening of the skin at the injection site.

EXAMPLE VIII

A three year old Poodle weighing 8 lbs. was diagnosed as having otitis-media. The symptoms exhibited by the animal were ataxia, anorexia, lateral deviation of head and a temperature of 103.4° F. The dog was administered 100 mg. of the composition of Example I by intramuscular injection four times a day for four days.

Results: By the third day, the animal began to regain its balance and hold its head normally.

EXAMPLE IX

A three year old rabbit weighing 10 lbs. was diagnosed as having acute pneumonia. The following symptoms were exhibited by the rabbit: severe respiratory conditions, acute pneumonia generalized throughout the lungs, severe anorexia and a temperature of 107.2° F. The rabbit was administered 200 mg. of the composition of Example I by intramuscular injection M.I.D. for two days.

Results: The rabbit recovered in 72 hours.

EXAMPLE X

A four month old, 4 lb. cat was diagnosed as having otitis-media due to ear mites. Symptoms exhibited by the cat were ataxia and a temperature of 105° F. The cat was administered 100 mg. of the composition of Example I three times a day for four days.

Results: The ataxia was eliminated after twenty-four hours and the cat completely recovered after seventy-two hours with no side effects.

EXAMPLE XI

A five year old cat weighing 10 lbs. was diagnosed as having interstitial nephritis. The symptoms exhibited by the cat were anorexia, swollen kidneys and a temperature of 102.5° F. The cat was administered 100 mg. of the composition of Example I three times a day for five days.

Results: The cat responded to this treatment after other treatments had failed and recovered in ninety-six hours with no side effects.

The following Examples XII and XIII are given to demonstrate the higher blood levels and maximum serum concentration obtained with the solutions of the invention.

EXAMPLE XII

An experimental unit consisted of five dogs (mixed sex). Three experimental units were used in the study. The table below describes the treatment and dosage received by each group.

| Group | Product | Route | Frequency | Dosage |
|---|---|---|---|---|
| A | Chloramphenicol solution of the invention. | Oral | Once | 25 mg./lb. body weight. |
| B | Chloromycetin capsules (Parke-Davis). | do | do | Do. |
| C | Placebo (solvent base) | I.M.[1] | do | Volume equivalent to that which would be administered if a product containing 100 mg./cc. were administered at a dose of 15 mg./lb. |

[1] This study was done simultaneously with a study on parenterally administered Chloramphenicol. Group C was the control group common to both studies. The parenteral route was selected because it was felt that any toxicity attributable to the placebo would be more likely to occur when administration was via the parenteral route, thus obviating the possibility that incomplete absorption from the gastrointestinal tract might result in misleading information regarding the systemic safety of this base.

Prior to drug administration, a 30 cc. blood sample was taken. This sample was assayed as the 0 Hour Sample. Following drug administration as described in the above table, a 30 cc. blood sample was again taken at 1, 2, 3, 6, 12 and 24 hours. Each blood sample was allowed to clot and the clot allowed to retract before centrifugation and separation of the serum. The serum was placed into three separate test tubes as follows:

(a) Not less than 3 cc. of serum were put in an 8 cc. plain Vacutainer® (B–D) tube for chemical analysis.
(b) Not less than 5 cc. were placed into each of two additional plain 8 cc. Vacutainer® (B–D) tubes for antibiotic assay.

Immediately following serum separation, all tubes were placed in a freezer and held frozen until sent to the analytical laboratory. One of the paired 5 cc. serum samples from each bleeding was sent for assay by a consulting chemist. The second of the paired samples was forwarded to another laboratory for a check assay. The assay methods used were the chemical method described by Grove and Randall in Assay Methods for Antibiotics, Method 3, Section B, page 74 and the *Sarcina Subflava* microbiological plate assay method.

The results obtained by the consulting chemist are shown in Graph I which is a comparison of serum levels of Groups A and B as determined chemically. Group C was essentially negative. The check results obtained by the other laboratory for each of the three groups is shown in Graph II which is a comparison of serum levels of Groups A and B as determined microbiologically. Group C was essentially negative.

As can be seen from Graphs I and II, higher blood levels were obtained than with the same dose of Chloromycetin capsules. Also, the maximum serum concentration was obtained within one hour with the solution of the invention whereas maximum serum concentration with the Chloromycetin capsules required up to two hours.

EXAMPLE XIII

An experimental unit consisted of five dogs (mixed sex). Three experimental units were used in the study. The table below describes the treatment and dosage received by each group.

(b) Not less than 5 cc. were placed into each of two additional plain 8 cc. Vacutainer® (B–D) tubes for antibiotic assay.

Immediately following serum separation, all tubes were placed in a freezer and held frozen until sent to the analytical laboratory. One of the paired 5 cc. samples from each bleeding was sent for assay by a consulting chemist. The second of the paired samples was forwarded to a laboratory for a check assay. The assay methods used by the consulting chemist and the laboratory are the same as employed in Example XII.

The results obtained by the consulting chemist are shown in Graph III which is a comparison of serum levels of Groups D and E as determined chemically. Group C was essentially negative. The results obtained by the laboratory are shown in Graph IV which is a comparison of the serum levels of Groups D and E as determined microbiologically. The C Group was essentially negative.

Examination of Graphs III and IV shows the following:

(1) The chloramphenicol solution of the invention administered intramuscularly produces adequate concentrations of chloramphenicol in the blood when administered at recommended dosages.

(2) Significantly higher blood levels were obtained with the chloramphenical solution of the invention than were obtained with a comparable dose of injectable chloromycetin. The levels remained higher until the sixth hour sample at which time they averaged 0.7 mcg./ml. lower than the injectable chloromycetin.

(3) The blood levels following administration of the chloromycetin reference standard failed at any time to reach reported therapeutic levels of 5 to 10 mcg./ml. of serum. In contrast, blood levels following administration of chloramphenicol solution of the invention were within or above 5 to 10 mcg./ml. of serum at 1, 2 and 3 hours post-injection.

It is claimed:

1. A method for the treatment of bacterial infections in the mammalian and avian orders of animals which comprises administrating effective dosages of chloramphenicol to said infected animals as a composition wherein each cubic centimeter consists essentially of:

Chloramphenicol—About 20 to 200 mg.
Niacinamide—About 5 to 10%
Ethyl alcohol—About 1 to 10%
Propylene glycol—Balance

| Group | Product | Route | Frequency | Dosage |
|---|---|---|---|---|
| C | Placebo (solvent base) | I.M. | Once | Volume equivalent to that which would be administered if a product containing 100 mg./cc. were administered at a dose of 15 mg./lb. body wt. |
| D | Chloromycetin intramuscular (Parke-Davis). | I.M. | do | 15 mg./lb. body weight. |
| E | Chloramphenicol solution of the invention. | I.M. | do | Do. |

Prior to drug administration, a 30 cc. blood sample was taken. This sample was assayed as the 0 Hour Sample. Following drug administration as described in the above table, a 30 cc. blood sample was again taken at 1, 2, 3, 6, 12 and 24 hours. Each blood sample was allowed to clot and the clot allowed to retract before centrifugation and separation of the serum. The serum was placed into three separate test tubes as follows:

(a) Not less than 3 cc. of serum were put in an 8 cc. plain Vacutainer® (B–D) tube for chemical analysis.

2. The method of claim 1 wherein the composition includes benzyl alcohol as a preservative.

3. The method of claim 1 wherein the animal treated is a dog.

4. The method of claim 2 wherein the composition consists essentially of:

Chloramphenicol—About 100 mg.
Niacinamide—About 5%
Ethyl alcohol—About 10%
Benzyl alcohol—About 2%
Propylene glycol—Balance 5. A method for the treatment of bacterial infections in dogs which comprises administrating effective dosages of chloramphenicol as a composition wherein each cubic centimeter consists essentially of:

Chloramphenicol—About 100 mg.
Niacinamide—About 5%
Ethyl alcohol—About 10%
Benzyl alcohol—About 2%
Propylene glycol—Balance.

References Cited

Modern Drug Encyclopedia, 9th ed., 1962, pp. 257 and 258.

SAM ROSEN, Primary Examiner

U.S. Cl. X.R.

424—266